(12) United States Patent
Delaitre et al.

(10) Patent No.: US 11,208,951 B2
(45) Date of Patent: Dec. 28, 2021

(54) SPRING PRELOAD ADJUSTMENT DEVICE FOR AN AIRCRAFT ENGINE AIR BLEED FLAP

(71) Applicant: SAFRAN AIRCRAFT ENGINES, Paris (FR)

(72) Inventors: Pascal Xavier Delaitre, Moissy-Cramayel (FR); Romain Nicolas Lagarde, Moissy-Cramayel (FR); Jean-Marc Claude Perrollaz, Moissy-Cramayel (FR); Antonin Etienne Diego Tessiereau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/046,217

(22) PCT Filed: Mar. 29, 2019

(86) PCT No.: PCT/FR2019/050732
§ 371 (c)(1),
(2) Date: Oct. 8, 2020

(87) PCT Pub. No.: WO2019/197744
PCT Pub. Date: Oct. 17, 2019

(65) Prior Publication Data
US 2021/0071577 A1    Mar. 11, 2021

(30) Foreign Application Priority Data
Apr. 13, 2018    (FR) ...................................... 1853251

(51) Int. Cl.
*F02C 6/08*    (2006.01)

(52) U.S. Cl.
CPC .......... *F02C 6/08* (2013.01); *F05D 2220/323* (2013.01); *F05D 2230/72* (2013.01)

(58) Field of Classification Search
CPC ............................. F02C 6/08; F05D 2220/323
See application file for complete search history.

(56) References Cited

U.S. PATENT DOCUMENTS 6,851,255 B2 * 2/2005 Aitchison ................. F02C 7/18
60/39.83
7,114,519 B2 * 10/2006 Aitchison ............. F16K 15/035
137/518

(Continued)

FOREIGN PATENT DOCUMENTS

EP    3095985 A1    11/2016
FR    1365570 A    7/1964

OTHER PUBLICATIONS

International Search Report received for PCT Patent Application No. PCT/FR2019/050732, dated Jul. 30, 2019, 4 pages (2 pages of English Translation and 2 pages of Original Document).

*Primary Examiner* — Lorne E Meade
(74) *Attorney, Agent, or Firm* — Womble Bond Dickinson (US) LLP

(57) ABSTRACT

An air bleed device for an aircraft engine, including a frame and a flap able to rotate about an axis in relation to the frame, the device further including a return system configured to bias the flap in a determined position about the axis and including a torsion spring, a first end of which is connected to the flap and a second end of which is connected to the frame. The second end is connected to the frame by adjusting the preload of the spring by screwing when the flap is in the determined position.

9 Claims, 2 Drawing Sheets

(56) References Cited

U.S. PATENT DOCUMENTS

| | | | |
|---|---|---|---|
| 7,493,770 B2 * | 2/2009 | Christianson | F02C 6/08 137/512.1 |
| 8,408,864 B2 * | 4/2013 | Fintescu | F01D 9/065 415/28 |
| 9,279,511 B2 * | 3/2016 | Bagge | F16K 21/14 |
| 2013/0263828 A1 | 10/2013 | Yamada et al. | |
| 2016/0341130 A1 * | 11/2016 | Marocchini | F02C 9/18 |

* cited by examiner

SPRING PRELOAD ADJUSTMENT DEVICE FOR AN AIRCRAFT ENGINE AIR BLEED FLAP

TECHNICAL FIELD

The present invention relates to the field of air bleed scoops or valves in the aircraft engines and more precisely their adjustment devices to adapt to the operation of the engine.

BACKGROUND

The problem of a precise control of the opening of an air bleed scoop arises for example in the case of an engine where this bleed is carried out in the secondary vein in order to adjust the clearances of the turbine.

According to an existing solution, illustrated in FIG. 1, a flap, not visible in its entirety, of a bleed scoop in the secondary vein of a turbomachine, is secured to a shaft 1 that rotates in a frame 2. The return of the flap when the scoop is not activated is ensured by a torsion spring 3 attached to one end on the frame 2 and at the other end to a part of the flap secured to the shaft 1, here at an abutment part 4. The adjustment of the abutment part 4 on the frame 2 allows the stroke of the shaft 1 to ensure with precision the extreme positions of the flap, whatever the variations in geometry induced by the manufacture of the parts.

However, since the spring 3 is attached directly to the frame 2 of the scoop on the one hand, and on the other hand on the shaft line 1, the adjustment of the abutments 4 of the flap has a direct impact on the calibration of the spring, without this being desired.

In addition, variability also exists in the production of the springs. This induces variability in the return torques for the same angular preload on the springs of the same production. In particular, this makes it difficult to ensure with a sufficient precision an identical calibration on a series of valves that have to operate together.

The prior art comprises in particular the document FR1365570.

The aim of the invention is to propose a simple alternative to overcome these disadvantages by using a spring to carry out the return of the flaps on air bleed devices, in particular for the valves previously described.

DISCLOSURE OF THE INVENTION

The invention relates to an air bleed device for an aircraft engine, comprising a frame and a flap able to rotate around an axis in relation to the frame, the device further comprising a return system configured to bias the flap into a determined position around the axis and comprising a torsion spring, a first end of which is connected to the flap and a second end of which is connected to the frame, characterized in that said second end is connected to the frame by means for adjusting the preload of the spring by screwing when the flap is in said determined position.

By interposing means for adjusting the position of the second end of the spring between the latter and the frame, it is possible to adjust the return torque independently of the given position of the flap. This makes it possible to overcome the above-mentioned disadvantages. On the one hand, for a given spring, the return torque can be adjusted by adjusting the abutment positions. On the other hand, for the same given position of the flap, it is possible to compensate manufacturing deviations between two springs to obtain the same calibration. The use of screwing is a simple solution to realize adjusting means and allows to avoid complex manoeuvres.

Advantageously, said means for adjusting comprise a connecting rod, a first end of which is articulated on said second end of the spring and an opposite second end of which is threaded and screwed into a tubular adjustment screw carried by said frame.

Preferably, said first end of the connecting rod is connected by a rotatable connection to said second end of the spring.

Even more preferentially, said first end of the connecting rod comprises a mounting hole a ball joint crossed by a guide ring in which said second end of the spring is engaged.

These last two elements allow the strand of the spring at the level of the second end to freely follow the movement of the connecting rod head. This ensures a precise and immediate guidance of the second end while avoiding any deformation of the strand of the spring.

Advantageously, said adjustment screw comprises a tubular body with inner thread which passes through a wall of said frame and in which said second threaded end of the connecting rod is screwed, and a head which rests on said wall and is configured to cooperate with a tool for driving this screw in rotation.

Preferably, a rotation preventing locking nut is screwed onto the adjustment screw. Even more preferentially, said nut is screwed on an outer thread of said tubular body and rests on said wall of the frame on the side opposite to said head.

Advantageously, said connecting rod extends along an axis substantially perpendicular to said second end of the spring and/or to the axis of rotation of the flap.

Advantageously, said spring is helical and extends substantially around said axis of rotation of the flap.

BRIEF DESCRIPTION OF THE FIGURES

The present invention will be better understood and other details, characteristics and advantages of the present invention will appear more clearly upon reading the following description, with reference to the annexed drawings on which.

DESCRIPTION OF AN EMBODIMENT OF THE INVENTION

Figure 1:
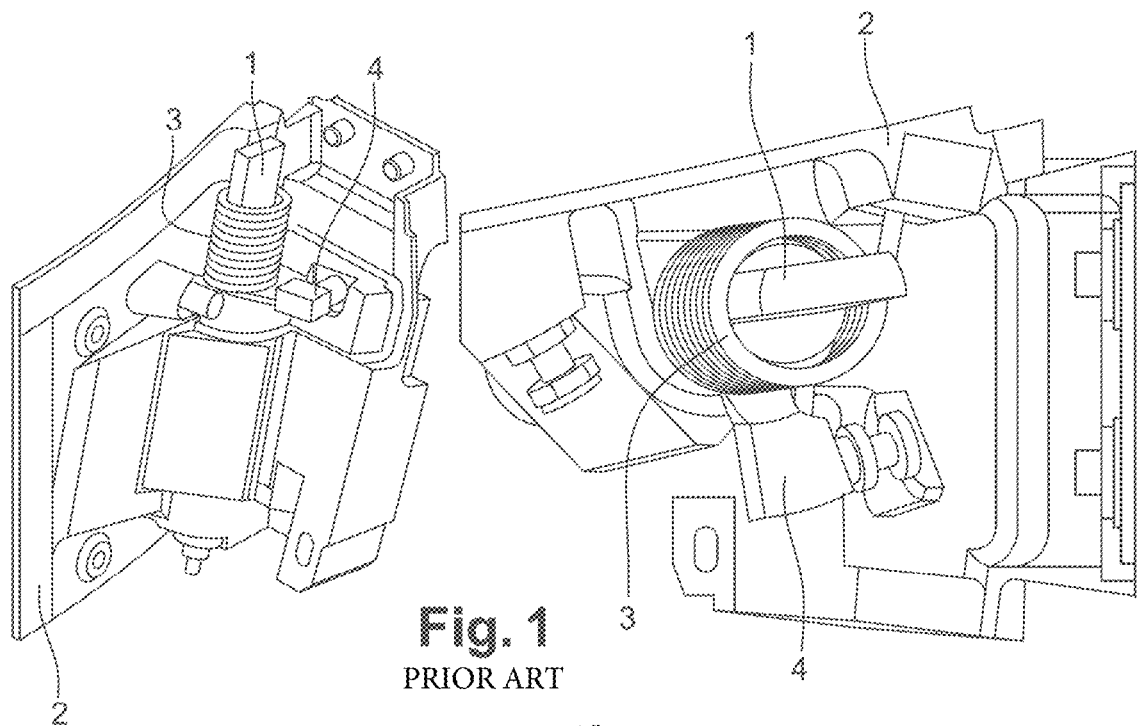
FIG. 1 represents a side view perspective and a front view perspective of a valve according to the prior art.
Figure 2:
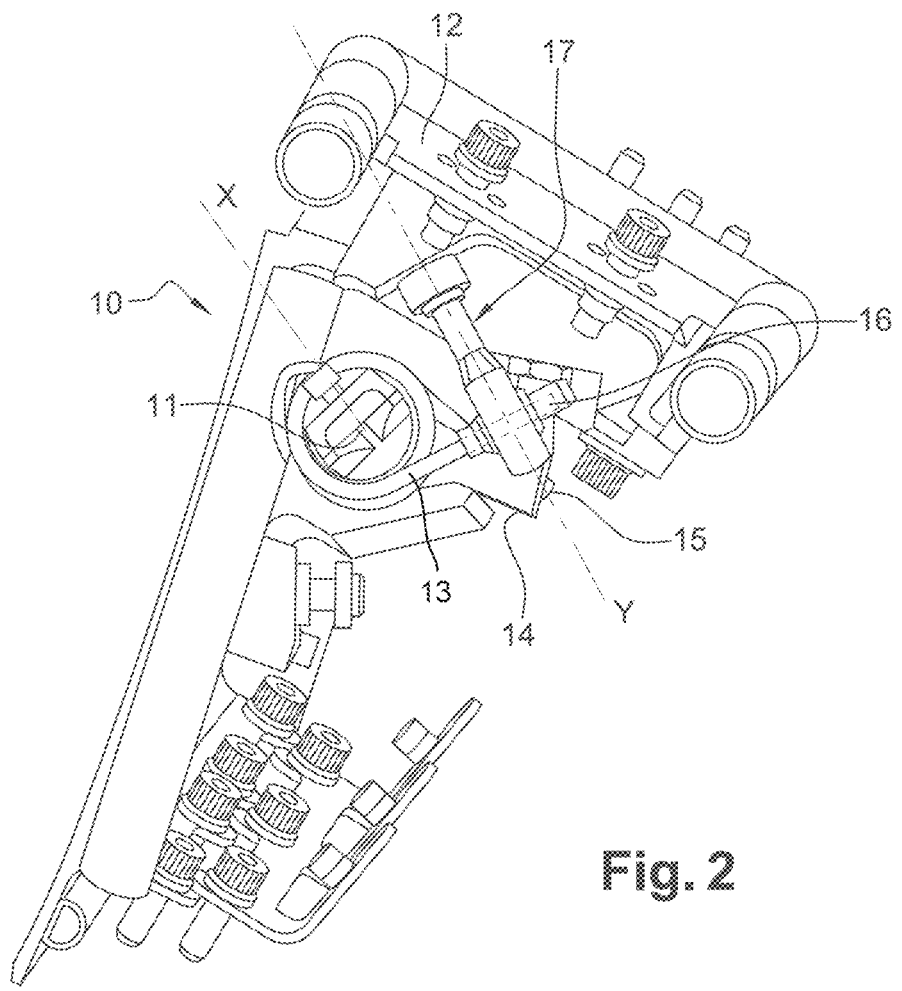
FIG. 2 represents a front view perspective of a valve according to the invention.

An example of a scoop 10 related to the invention, with reference to FIG. 2, comprises the same mechanisms as the scoop presented in introduction for the rotational movement of the flap around the axis X of its shaft 11 with respect to the frame 12. Here, the shaft line 11 and a part 14 are the only visible parts of the flap. The scoop can be similar in all respects to the previous one, except for the return mechanism of the flap. Here, a torsion spring 13, winding around the shaft 11 with a number of coils adapted to the level of the desired return force, is attached by a first 15 of its ends to a part 14 of the flap. This part 14 can be used, as before, to adjust the abutments of the flap. On the other hand, the second end 16 of the torsion spring is attached to a device 17 that interfaces with the frame 12.

Figure 3:
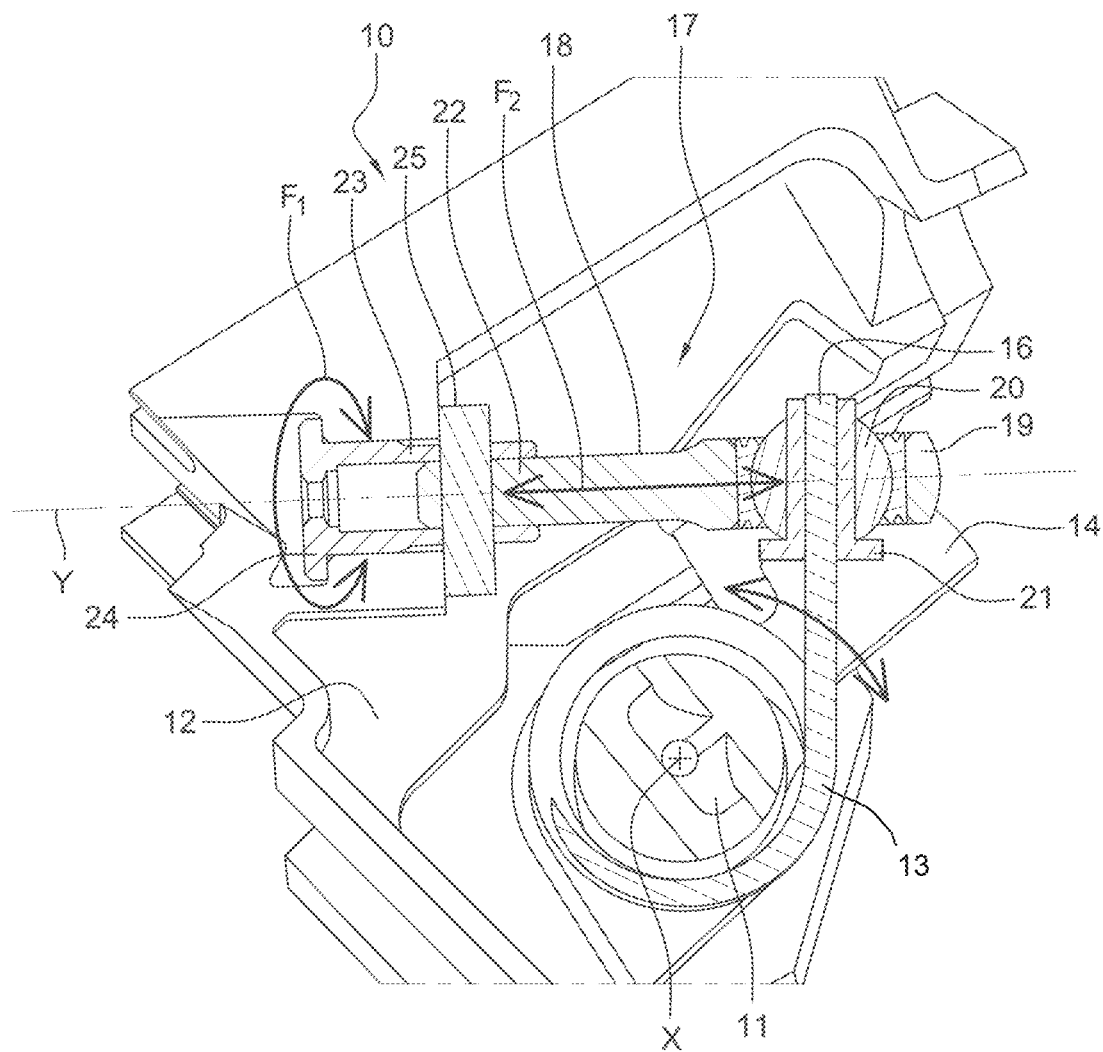
FIG. 3 represents a front view, perpendicular to the axis of rotation of the flap, with a cross-section at the level of the element 17, of the valve of FIG. 2.

Referring to FIG. 3, this device 17 comprises several parts, so that the return torque of the spring 13 can be adjusted independently of the position of the flap around the axis X of the shaft 11 when it is in abutment. In FIG. 3, the flap is in an abutment position defined by the adjustment of the interaction of the part 14 with the frame 12.

The device 17 comprises a connecting rod 18 which is mounted in the frame 12 so as to be substantially perpendicular to the shaft 11, next to the latter and positioned so as the second end 16 of the spring 13 passes through.

For this purpose, a first end 19 of the connecting rod 18, which is at the level of the shaft 11 of the flap, comprises a ball joint 20 with a cylindrical bore to accommodate the second end 16 of the torsion spring 13.

Advantageously, the cylindrical bore of the ball joint 20 contains a guide ring 21. The presence of the guide ring 21 enables the diameter of the passage for the rod of the spring 13 to be precisely adjusted at its second end 16, in order to achieve a precise guidance of the rod of the spring 13 in the ball joint 20.

A second end 22 of the connecting rod 18, on the side of the frame 12, comprises an outer thread shaped to cooperate with the tapping of a hollow tubular adjustment screw 23, installed in a bore of the frame 12 so as to pass through it along the axis Y of the connecting rod 18.

The adjustment screw 23 comprises a head 24 that is positioned in abutment against a surface of the frame 12 located on the other side of the frame with respect to the second end 16 of the spring 13. Advantageously, said head 24 comprises a pattern cavity to accommodate an adjustment key that allows it to be rotated in the bore of the frame about the axis Y of the connecting rod 18.

Said adjustment screw 23 also has an outer thread on its part protruding from the frame 12 towards the spring. A lock nut 25 is screwed onto the outer thread of the screw 23, resting on the frame 12 on the side opposite the head 24 of the screw. The lock nut 25 is preferably self-braking, flanged in position.

The device described above can thus be used to adjust the pre-load, or calibration, of the spring 13 when the flap is in the position shown in FIG. 3 by the positions of its shaft 11 and the part 14, here serving as an abutment in rotation while maintaining the first end 15 of the spring 13. The adjustment method comprise the following steps.

First, the lock nut 25 is loosened to release the adjustment screw 23.

In a second step, the adjustment screw 23 is rotated, using a suitable key, around its axis Y as indicated by the arrow F1. Since the connecting rod 18 is locked in rotation by the presence of the second end 16 of the spring in the guide ring 21, the rotation of the adjustment screw 23 drives the connecting rod 18 to be screwed in or unscrewed out of its tapping. As indicated by the arrow F2, this action thus moves the head 19 of the connecting rod 18 in translation along its axis Y, the direction of which is substantially perpendicular to the axis X of the shaft 11. The translation of the head 19 of the connecting rod drives with it the second end 16 of the spring 13. The rotational movement of the ball joint 20 and the sliding of the strand of the spring 13 in the guide ring 21 allow the second end 16 of the spring 13 to follow simultaneously and without local deformation the displacement of the connecting rod 18.

In this way, the strand of the spring 13 connecting its second end 16 to the last winding coil performs a rotational movement around the axis X of the shaft 11 of the flap, which changes its torsion angle and thus the calibration of the spring 13.

The adjustment screw 23 is thus turned in the appropriate direction around its axis Y until the specified return torque for the spring is obtained.

In the last step, the self-braking nut 25 is tightened to lock the adjustment system.

The advantage of this method is that it can be repeated to readjust the calibration, or preload, of the spring 13 to a modified abutment position of the flap, for example here by modifying the interaction of the part 14 with the frame 12, since at no time does it interfere with the first end 15 attached to the flap.

The invention claimed is:

1. An air bleed device for an aircraft engine, comprising a frame and a flap able to rotate around an axis in relation to the frame, the device further comprising a return system configured to bias the flap into a determined position around the axis and comprising a torsion spring, a first end of which is connected to the flap and a second end of which is connected to the frame, wherein said second end is connected to the frame by means for adjusting the preload of the spring by screwing when the flap is in said determined position;

said means for adjusting comprise a connecting rod, a first end of which is articulated on said second end of the spring and an opposite second end of which is threaded and screwed into a tubular adjustment screw carried by said frame.

2. The air bleed device according to claim 1, wherein said first end of the connecting rod is connected by a rotatable connection to said second end of the spring.

3. The air bleed device according to claim 2, wherein said first end of the connecting rod comprises a mounting hole for a ball joint crossed by a guide ring in which said second end of the spring is engaged.

4. The air bleed device according to claim 1, wherein said tubular adjustment screw comprises a tubular body with inner thread which passes through a wall of said frame and in which said second threaded end of the connecting rod is screwed, and a head which rests on said wall and is configured to cooperate with a tool for driving this screw in rotation.

5. The air bleed device according to claim 1, wherein a rotation preventing locking nut is screwed onto the tubular adjustment screw.

6. The air bleed device according to claim 5, wherein said rotation preventing locking nut is screwed on an outer thread of said tubular body and rests on said wall of the frame on the side opposite to a head of said tubular adjustment screw.

7. The air bleed device according to claim 1, wherein said connecting rod extends along a Y-axis substantially perpendicular to said second end of the spring.

8. The air bleed device according to claim 1, wherein said connecting rod extends along an axis a Y-axis a substantially perpendicular to the axis of rotation of the flap.

9. The air bleed device according to claim 1, wherein said spring is helical and extends substantially around said axis of rotation of the flap.

* * * * *